Figure 1:
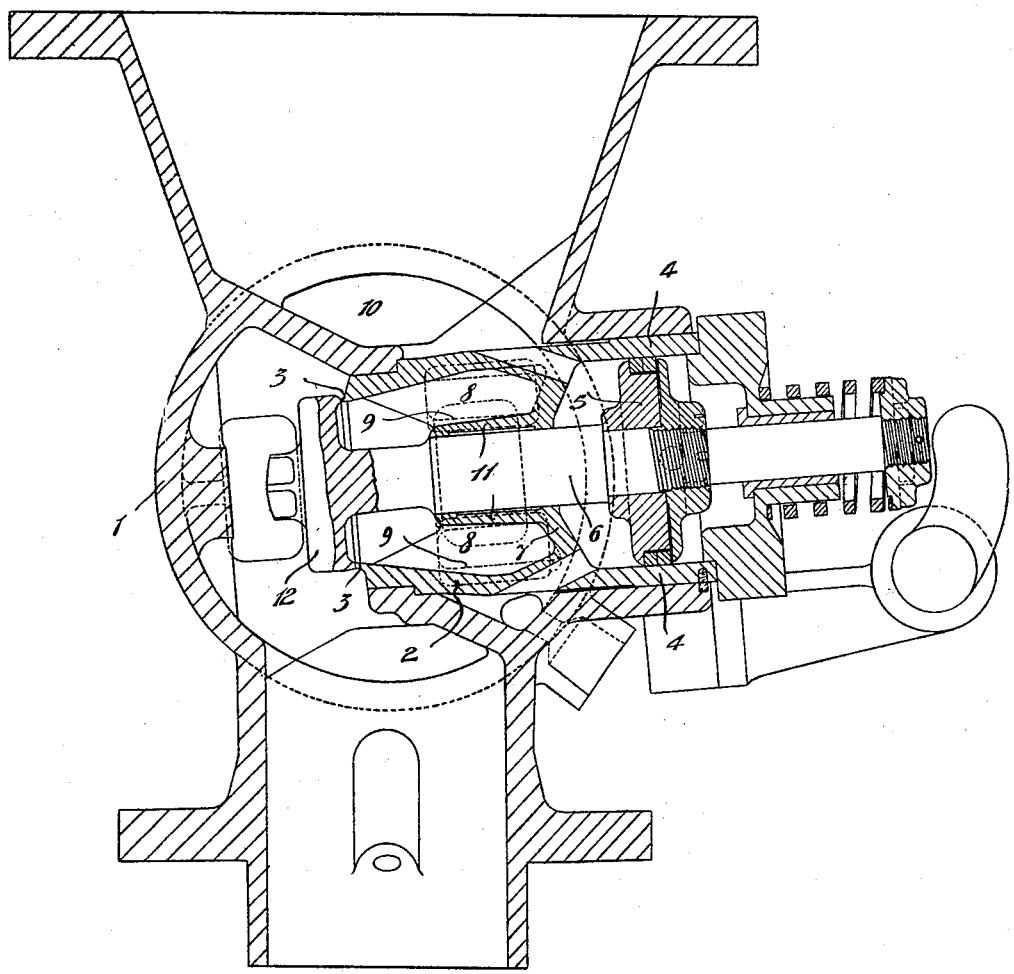

D. COCKBURN AND D. MacNICOLL.
SAFETY VALVE.
APPLICATION FILED APR. 7, 1916.

1,325,508.

Patented Dec. 23, 1919.
3 SHEETS—SHEET 1.

INVENTORS
David Cockburn
Donald MacNicoll

BY Marcus D Blondel
ATTY

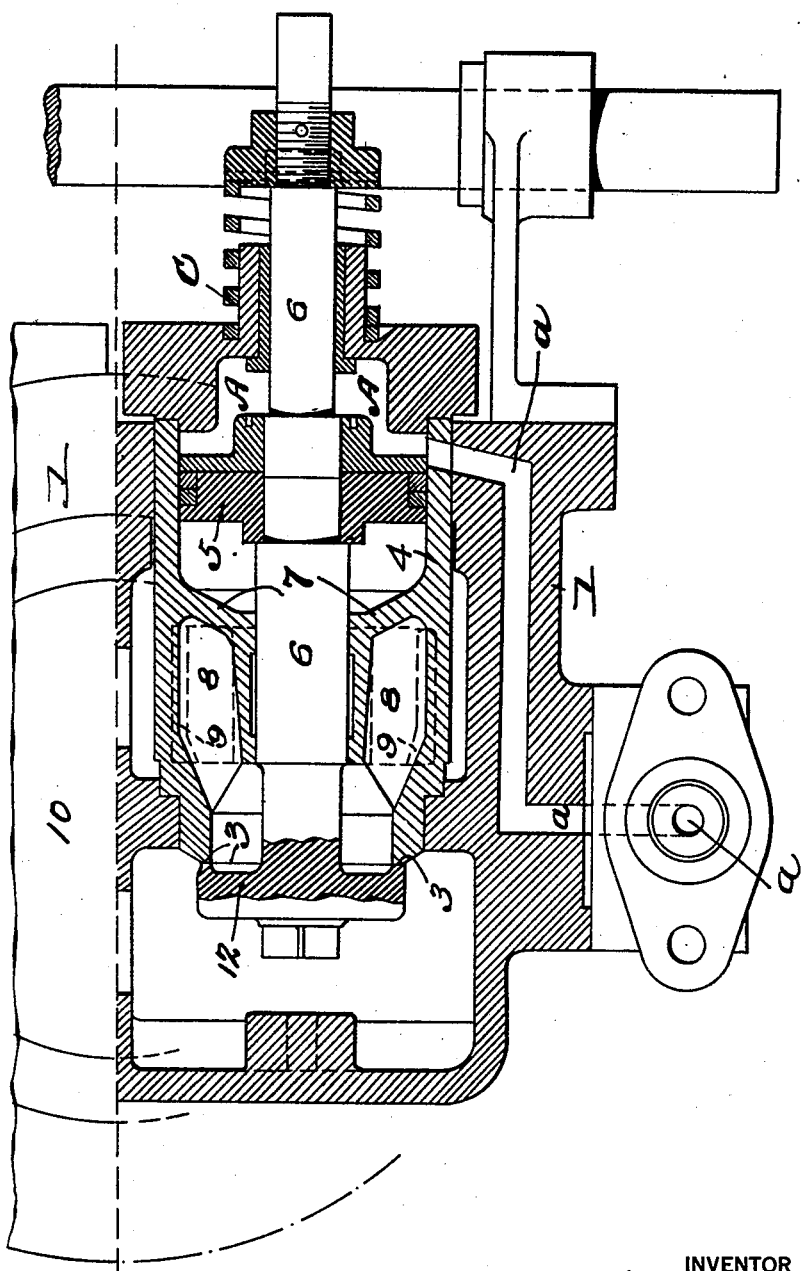

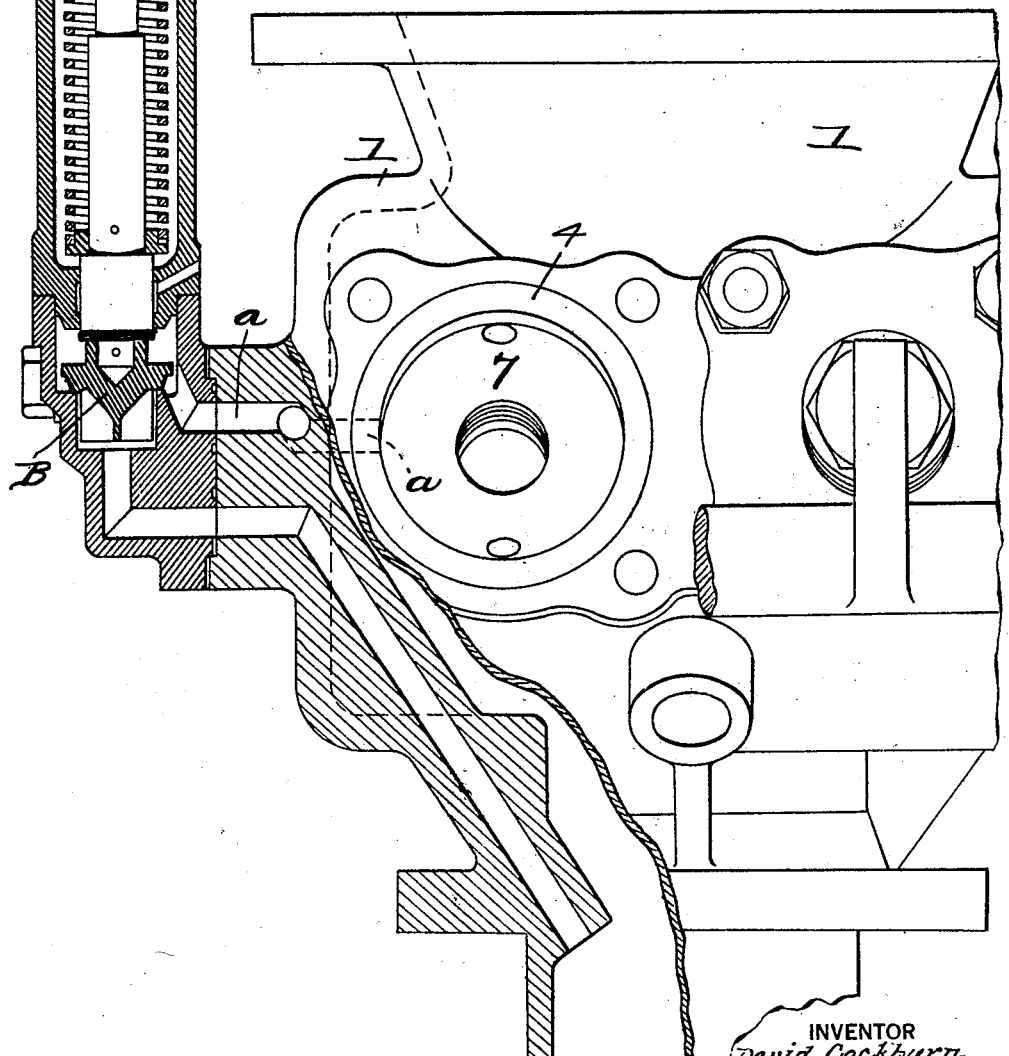

# UNITED STATES PATENT OFFICE.

DAVID COCKBURN AND DONALD MacNICOLL, OF CARDONALD, NEAR GLASGOW, SCOTLAND.

SAFETY-VALVE.

1,325,508.

Specification of Letters Patent.

Patented Dec. 23, 1919.

Application filed April 7, 1916. Serial No. 89,579.

*To all whom it may concern:*

Be it known that we, DAVID COCKBURN and DONALD MACNICOLL, subjects of the King of the United Kingdom of Great Britain and Ireland, and both residing at Cardonald, near Glasgow, Scotland, have invented a certain new and useful Improvement in Safety-Valves, of which the following is a specification.

The invention relates to safety valves of the type comprising a valve chest, a seating in said chest, a cylinder in said chest, a valve engageable with said seating and controlled by a piston movable in said cylinder, and a pilot valve adapted on excess of a predetermined pressure to permit ingress of fluid under pressure to said cylinder so as to operate said piston.

Experience in connection with such valves has shown that, the valve seating being formed on a diaphragm of irregular formation, there is a tendency for the valve to leak on account of warping of the valve face, and the seating being incapable of removal the chest is rendered useless on destruction of the seating.

Broadly regarded, the invention consists in the adaptation to a valve of this type of a removable valve cage of uniform structure which will serve as a seating for the valve proper, as a guide for the valve spindle and also as a housing for the piston which controls the valve.

In the drawings, illustrating the invention, in the several figures of which like parts are similarly designated, Figure 1 is a sectional elevation of a valve chest embodying our invention. Fig. 2 is a sectional elevation drawn through the valve cylinder and the valve illustrating the inlet port leading to the cylinder back of the piston. Fig. 3 is a vertical sectional elevation illustrating the pilot valve and its control of the passage to the cylinder.

As shown the valve chest 1 is fitted with a cage 2 formed as a hollow cylinder penetrating the side of the valve chest 1 and studded thereto, the axis of the cage being coincident with the axis of the valve spindle. The inner end of the cage is formed as at 3 with a valve seat and its outer end is formed with a cylinder 4 wherein is fitted a piston 5 which controls the movement of the valve 12. The spindle 6 of the valve is slidably held in a guide 11 extending from a divisional wall 7 formed in the cage 2 which serves to isolate the piston 5 from direct impingement of steam passing through the cage. The inner end of the cage is formed with a chamber 8 the peripheral wall of which is ported as at 9 to permit passage of steam to the waste or exhaust steam space 10. The valve 12 is held to its seat by a spring C surrounding the outer end of the spindle 6 and which is interposed between the head of the cage and a nut threaded on the outer end of the spindle. B designates a pilot valve controlling the passage of steam to the piston cylinder.

As will be understood, the opening movement of the valve 12 is effected in opposition to the spring C, by the pressure of steam acting on the piston 5, steam being admitted to the space A back of the piston 5 by way of a passage $a$ controlled by the pilot valve B.

What we claim is:—

In a safety valve, in combination, a valve chest, a cage member comprising a cylindrical structure removably fitted to said chest, and a ported diaphragm dividing said cage transversely to form two compartments, one compartment formed as a cylindrical cavity, the lateral wall of the other compartment being ported for passage of steam, said other compartment being formed at the free end with a seating face and having a boss presenting a spindle guide, a valve spindle fitted in said guide, and a valve-operating piston fitted on said spindle and movable in said cavity.

In testimony whereof we have signed our names to this specification in the presence of two subscribing witnesses.

DAVID COCKBURN.
DONALD MacNICOLL.

Witnesses:
DOUGLAS KEITH FAIRWEATHER,
HENRY MASON.